United States Patent
Ou et al.

(10) Patent No.: US 8,076,594 B2
(45) Date of Patent: Dec. 13, 2011

(54) PROTECTION DEVICE FOR PROTECTING A FLAT CABLE

(75) Inventors: Hsien-Chung Ou, Taoyuan County (TW); Li-Li Yang, Taoyuan County (TW); Chen-Fu Chang, Taoyuan County (TW); Jen-Chen Wu, Taoyuan County (TW)

(73) Assignee: Quanta Storage Inc., Guishan Shiang, Taoyuan County (TW)

( * ) Notice: Subject to any disclaimer, the term of this patent is extended or adjusted under 35 U.S.C. 154(b) by 327 days.

(21) Appl. No.: 12/432,756

(22) Filed: Apr. 30, 2009

(65) Prior Publication Data
US 2010/0032203 A1    Feb. 11, 2010

(30) Foreign Application Priority Data
Aug. 7, 2008 (TW) .............................. 97130189 A

(51) Int. Cl.
*H02B 1/40* (2006.01)
(52) U.S. Cl. .................. 174/480; 720/653; 720/601
(58) Field of Classification Search ............. 174/480
See application file for complete search history.

(56) References Cited

U.S. PATENT DOCUMENTS

| | | | | |
|---|---|---|---|---|
| 5,831,956 | A * | 11/1998 | Sawai et al. ............... | 720/600 |
| 6,151,284 | A * | 11/2000 | Watanabe et al. .......... | 720/601 |
| 6,320,835 | B1 * | 11/2001 | Kamei ...................... | 720/653 |
| 6,341,115 | B1 * | 1/2002 | Otani et al. ............... | 720/653 |
| 6,910,218 | B2 * | 6/2005 | Park et al. ................. | 720/653 |
| 7,234,149 | B2 * | 6/2007 | Takahashi et al. .......... | 720/601 |
| 7,698,714 | B2 * | 4/2010 | Choi ......................... | 720/601 |

FOREIGN PATENT DOCUMENTS
JP     2000021155 A * 1/2000
TW        568326    12/2003

* cited by examiner

*Primary Examiner* — Timothy Thompson
*Assistant Examiner* — Hiram E Gonzalez
(74) *Attorney, Agent, or Firm* — Winston Hsu; Scott Margo

(57) ABSTRACT

The invention provides a protection device for protecting a flat cable in an optical disk drive. The protection device includes a casing, whereon a main board is fixed inside the casing, and an opening is formed at a front edge of the casing. The protection device further includes a tray disposed inside the casing in a slidable manner, a circuit board disposed on a bottom of the tray, the flat cable connected to the main board and the circuit board, a cover disposed on the bottom of the tray, and a support frame connected to the cover and protruding towards a rear of the casing. The support frame is disposed on the bottom of the tray and adjacent to a position, where the flat cable is connected to the circuit board, for holding the flat cable and preventing the flat cable from dropping.

5 Claims, 4 Drawing Sheets

PROTECTION DEVICE FOR PROTECTING A FLAT CABLE

BACKGROUND OF THE INVENTION

1. Field of the Invention

The present invention relates to an optical disk drive, and more particularly, to a protection device for protecting a flat cable which is connected between a tray and a main board.

2. Description of the Prior Art

An optical disk drive utilizes a flat cable electrically connected to a movable tray and a fixed main board for providing transmission of electricity and signals of electrical components of the tray. The reliability of the optical disk drive could be maintained with stable transmission of electricity and signals in a long period of operation when the flat cable moves with the tray smoothly.

As shown in FIG. 1, FIG. 1 is a section diagram of a conventional optical disk drive 10 disclosed in TW patent 568326. The optical disk drive 10 includes a hollow casing 11, whereon a main board 12 and a tray 13 are disposed. The main board 12 is fixed inside the casing 11. The flat cable 14 includes a fixing portion 14a and a movable portion 14b. An end of the fixing portion 14a which is set on a casing 11 is connected to the main board 12, and an end of the movable portion 14b is connected to a circuit board 15 disposed on a bottom of the tray 13 for providing the transmission of electricity and signals of the electrical components of the tray 13, such as a spindle motor 16 and a pickup head 17. The tray 13 is drawn out of the casing 11 for replacing an optical disk 18 and is slid in the casing 11 for reading data on the optical disk 18. The spindle motor 16 rotates the optical disk 18, the pickup head 17 moves along radial direction of the optical disk 18 for reading data on the optical disk 18, and then the data on the optical disk 18 is transmitted to the main board 12 for processing via the circuit board 15 and the flat cable 14.

Because the tray 13 have to be drawn out of the casing 11 for replacing the optical disk 18 easily, the movable portion 14b of the flat cable 14 made of thin and soft plastic materials is easily dropping. The over dropping movable portion 14b, as shown a dotted circle in FIG. 1, often touches or engages with an edge of the casing 11 easily, so that the flat cable 14 is damaged when the tray 13 slides in the casing 11. The flat cable 14 is even short to affect the transmission of electricity and signals or hinders the tray 13 from sliding in/out the casing 11. In order to solve above-mentioned problems, a dropping part of the movable portion 14b can be coated with Mylar to form a supporting portion 14c in the prior art, so that elasticity of the flat cable 14 is improved for holding the movable portion 14b and for preventing the movable portion 14b from dropping.

However, the elasticity of the flat cable 14 is not strong originally. After adding a weight of the supporting portion 14c on the flat cable 14, the flat cable 14 drops down more easily, especially in a surrounding at high temperature with frequent operation. Besides, when the tray 13 slides in the casing 11, friction between the movable portion 14b and casing 11 hinders the movable portion 14b from moving backwards, so that the movable portion 14b drops down easily. Therefore, a protection device for protecting the flat cable in the conventional optical disk drive still has some problems which have to be solved.

SUMMARY OF THE INVENTION

According to the claimed invention, a protection device for protecting a flat cable in an optical disk drive includes a support frame connected to a cover for holding the flat cable and for preventing the flat cable from dropping.

According to the claimed invention, a protection device for protecting the flat cable in the optical disk drive utilizes the support frame to hold a movable portion of the flat cable for strengthening connecting intensity of the flat cable and for preventing the flat cable from dropping when the tray slides in/out a casing.

According to the claimed invention, a protection device for protecting the flat cable in the optical disk drive includes the support frame as stair structure without hitting a main board for holding most of the flat cable and for preventing the flat cable from being broken.

According to the claimed invention, a protection device for protecting the flat cable in the optical disk drive includes the support frame connected to a bottom of a tray for holding part of the flat cable and for preventing the flat cable from dropping.

According to the claimed invention, a protection device for protecting a flat cable in optical disk drive includes a casing, whereon an opening is formed at a front edge of the casing, and a main board being fixed inside the casing, a tray disposed inside the casing in a slidable manner through the opening, a circuit board being disposed on a bottom of the tray, a flexible cable connected to the main board and the circuit board, a cover disposed on the bottom of the tray, and a support frame disposed on the bottom of the tray and adjacent to a position, where the flat cable is connected to the circuit board, for holding the flat cable.

According to the claimed invention, a protection device for protecting the flat cable in the optical disk drive includes the support frame bent towards the tray as an L-shape structure after extending a predetermined distance away from a circuit board, and the L-shape structure can be bent towards the tray to hold the flat cable on the bottom of the tray for strengthening connecting intensity of the flat cable. A rear of the support frame adjacent to the circuit board is bent towards the tray for holding the flat cable on the bottom of the tray and for extending parallel to the bottom of the tray. The predetermined distance is substantially within one-fourths and three-fourths of a distance between the opening and an end of the circuit board when the tray is drawn out of the casing so as to form the stair structure for holding most of the flat cable and for preventing the support frame from hitting the main board.

According to the claimed invention, a protection device for protecting the flat cable in the optical disk drive includes the support frame connected to the bottom of the tray directly, the support frame is a slice and crosses over the flat cable, and the support frame can be integrated with the tray monolithically or be fixed on the bottom of the tray with a screw or a rivet to hold the flat cable for preventing the flat cable from dropping.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
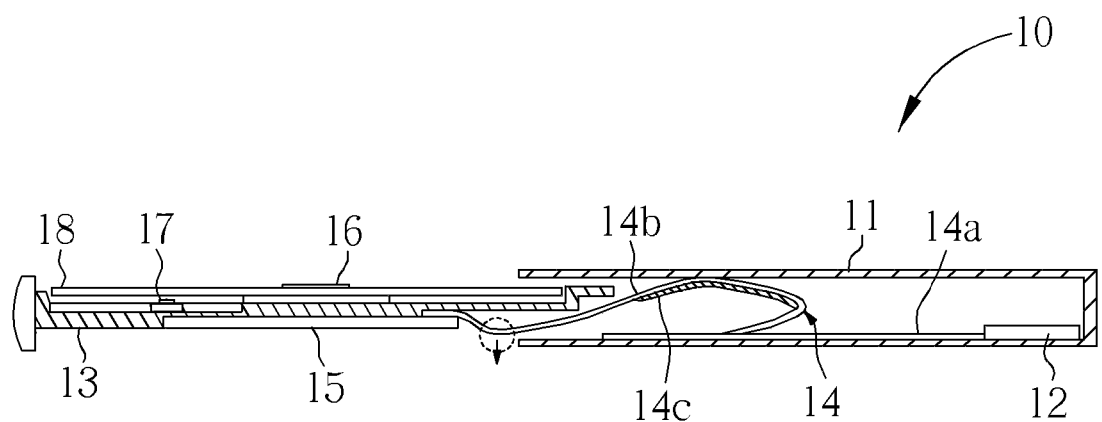
FIG. 1 is a section diagram of an optical disk drive in the prior art.
Figure 2:
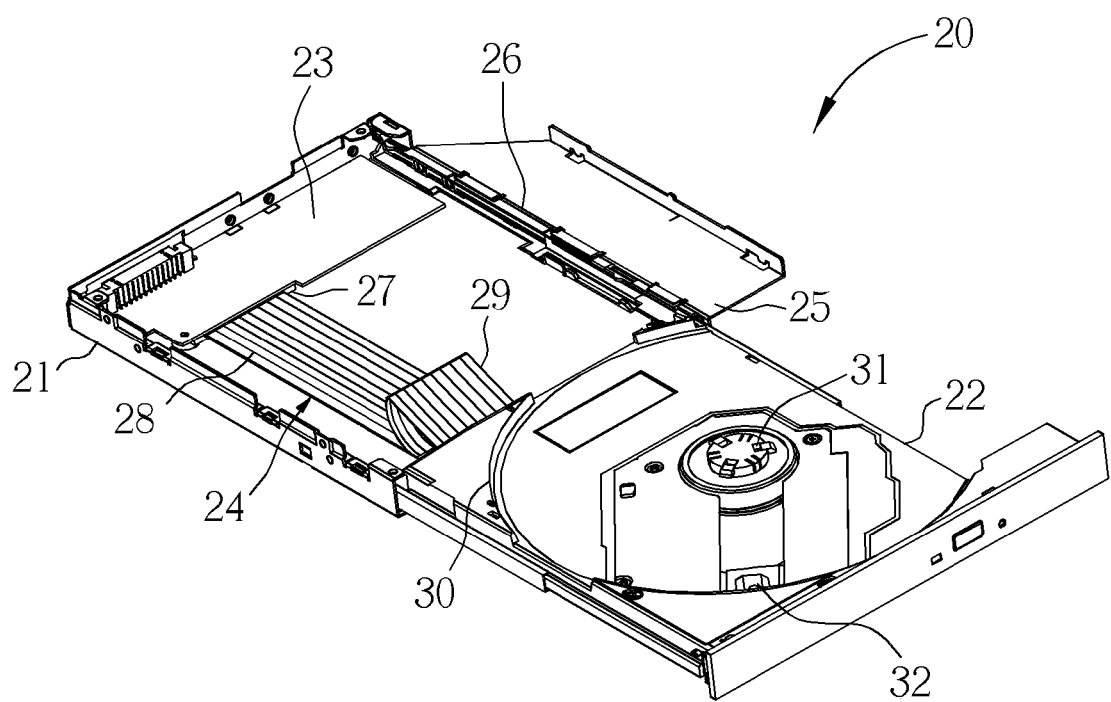
FIG. 2 is a front view diagram of a protection device for protecting a flat cable in an optical disk drive according to a first embodiment of the present invention.

Please refer to FIG. 2. FIG. 2 is a front view diagram of a protection device for protecting a flat cable 24 in an optical disk drive 20 according to a first embodiment of the present invention. The optical disk drive 20 includes a casing 21, a tray 22, a main board 23, and the flat cable 24. The tray 22 is disposed inside the hollow casing 21 in a slidable manner. An end of the flat cable 24 is connected to the tray 22, and the other end of the flat cable 24 is connected to the main board 23 disposed inside the casing 21, so that the flat cable 24 can be used to transmit electricity and signals when the tray 22 slides relative to the main board 23.

In addition, an opening 25 is formed at a front edge of the casing 21, two guiding tracks 26 are disposed on two sides of the casing 21 respectively, the main board 23 is disposed on a rear of the casing 21, and a connector 27 is disposed on a front edge of the main board 23. The tray 22 can slide in/out the casing 21, and the two guiding tracks 26 support two sides of the tray 22. In this embodiment, the flat cable 24 is a soft slice which can be a Flexible Flat Circuit (FFC) or a Flexible Printed Circuit (FPC). The flat cable 24 includes a fixing portion 28 and a movable portion 29 basically. An end of the fixing portion 28 is connected to the connector 27 disposed on the front edge of the main board 23, and the remaining part of the fixing portion 28 is fixed on a bottom of the casing 21 by an adhesive or a rivet, stretching form the connector 27 to the opening 25 of the casing 21. In addition, the movable portion 29 of the flat cable 24 stretches from an end of the fixing portion 28 locating at the opening 25 of the casing 21 and folds backwards into inner of the casing 21. The movable portion 29 is not fixed, hangs above the fixing portion 28 and connected with a rear of a tray 22 on the other end.

Figure 3:
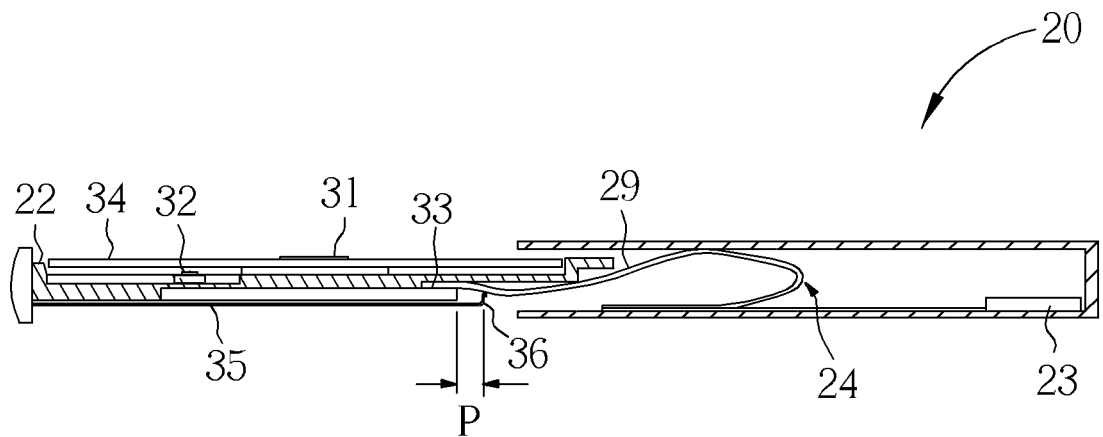
FIG. 3 is a sectional diagram of the optical disk drive according to the first embodiment of the present invention.

A recession 30 is formed on the tray 22. A spindle motor 31 is disposed on a center of the recession 30, and a pickup head 32 is disposed on radical of the recession 30. The pickup head 32 can move along the radical direction of the recession 30. As shown in FIG. 3, FIG. 3 is a sectional diagram of the optical disk drive 20 according to the first embodiment of the present invention. A circuit board 33 is disposed on a bottom of the tray 22. An end of the movable portion 29 is connected to a rear of the circuit board 33 so that the circuit board 33 is electrically connected to the main board 23 for transmitting electricity and signals via the flat cable 24. The spindle motor 31 is for rotating an optical disk 34 loading on the recession 30, and the pickup head 32 is for reading data on the optical disk 34.

Figure 4:
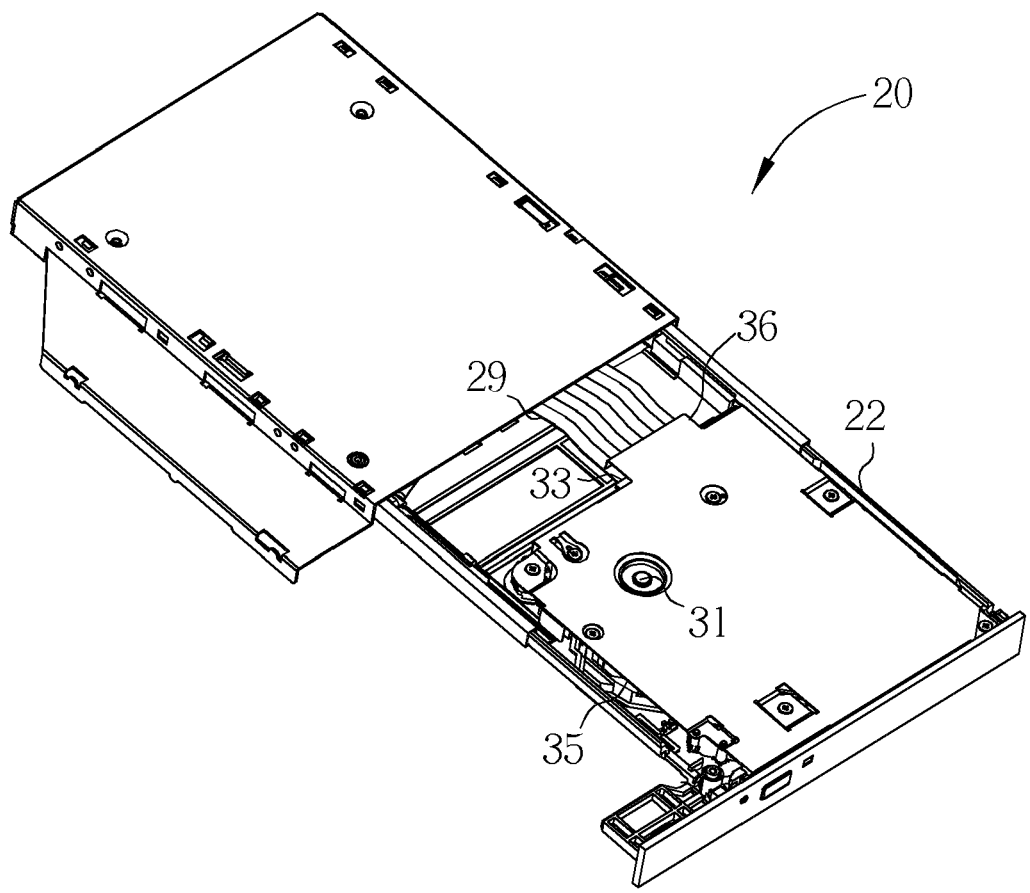
FIG. 4 is a back view diagram of the optical disk drive according to the first embodiment of the present invention.

Please refer to FIG. 3 and FIG. 4 simultaneously. FIG. 4 is a back view diagram of the optical disk drive 20 according to the first embodiment of the present invention. A cover 35 made of metal material is disposed on the bottom of the tray 22. The cover 35 is a thin metal slice for covering electrical components, such as the spindle motor 31, the pickup head 32, and the circuit board 33, for preventing electromagnetic interference and for avoiding electrostatic disturbance when the tray 22 is drawn out of the casing 21. A support frame 36 is an L-shape structure adjacent to a position, where the flat cable 24 is connected to the circuit board 33. The support frame 36 disposed on a bottom of the movable portion 29 of the flat cable 24 can be integrated with the cover 35 monolithically. After the support frame 36 is extended for a predetermined distance P away from the circuit board 33, an end of the support frame 36 is bent towards the tray 22 for holding the movable portion 29 and for preventing the movable portion 29 from dropping.

Therefore, the protection device for protecting the flat cable 24 in the optical disk drive 20 according to the first embodiment of the present invention utilizes the support frame 36 extending from the cover 35 to hold the movable portion 29 of the flat cable 24 for preventing the flat cable 24 from dropping.

Figure 5:
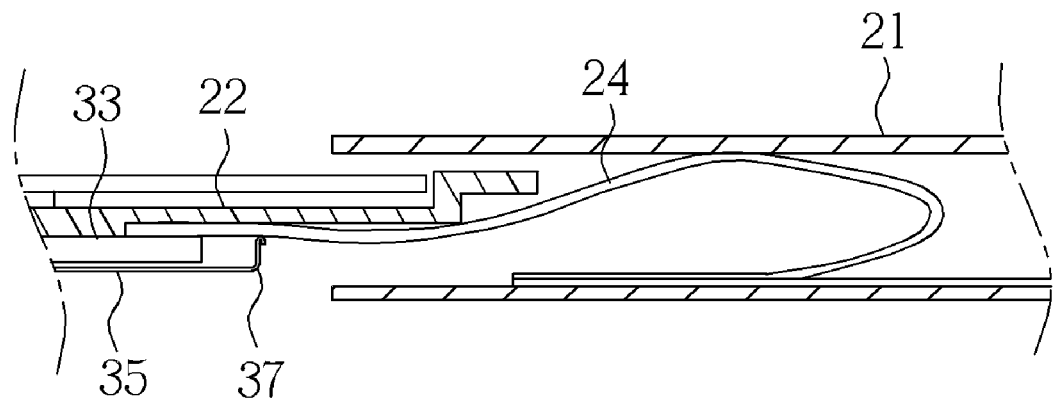
FIG. 5 is a sectional diagram of a protection device for protecting the flat cable in the optical disk drive according to a second embodiment of the present invention.

Please refer to FIG. 5. FIG. 5 is a sectional diagram of a protection device for protecting the flat cable 24 in the optical disk drive 20 according to a second embodiment of the present invention. A basic structure of this embodiment is the same as the structure of the first embodiment. Please note that elements with the same reference numerals are substantially the same through the various embodiments for simplicity. Difference between the second embodiment and the first embodiment is structure of a support frame 37. After extending from the cover 35, an end of the support frame 37 is bent upwards as an L-shaped structure so that the flat cable 24 can be held against the bottom of the tray 22. The support frame 37 not only holds the flat cable 24 but also clamps the end of the flat cable 24, which is connected to the circuit board 33, with the bottom of the tray 22, so that the force dragging the flat cable 24 does not affect an connecting end of the flat cable 24 when the tray 22 slides in/out the casing 21 repeatedly. Therefore, this embodiment utilizes the support frame 37 to hold the movable portion 29 of the flat cable 24 for strengthening connecting intensity of the flat cable 24 and for preventing the flat cable 24 from dropping when the tray 22 slides in/out the casing 21.

Figure 6:
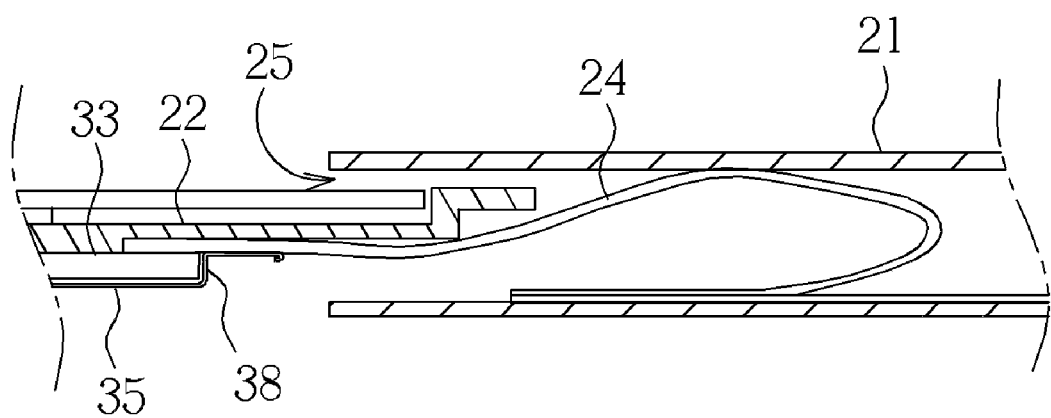
FIG. 6 is a sectional diagram of a protection device for protecting the flat cable in the optical disk drive according to a third embodiment of the present invention.

As shown in FIG. 6, FIG. 6 is a sectional diagram of a protection device for protecting the flat cable 24 in the optical disk drive 20 according to a third embodiment of the present invention. Although more backward extending distance of the support frame can hold more dropping part of the flat cable, it increases possibility that the support frame having longer extending distance hits the main board. The extending distance of the support frame is limited by a width of the main board. The width of the main board can be decreased for increasing the extending distance of the support frame, but disposition of the main board becomes complicated accordingly. A basic structure of this embodiment is the same as the structure of the first embodiment. Difference between the first embodiment and the third embodiment is structure of a support frame 38. After extending from the cover 35, an end of the support frame 38 adjacent to the circuit board 33 is bent upwards so that the flat cable can be held against the bottom of the tray 22. Then, the end of the support frame 38 extends for a predetermined distance parallel to the bottom of the tray 22. The predetermined distance is substantially within one-fourths and three-fourths of a distance between the opening 25 and an end of the circuit board 33 when the tray 22 is drawn out of the casing 21 as a stair structure. The support frame 38 can hold most part of the flat cable 24 without hitting the main board 23. Because the support frame 38 is designed as the stair structure, it can extend the predetermined distance of the support frame 38 for holding most part of the flat cable 24 and for preventing the flat cable 24 from being broken.

Figure 7:
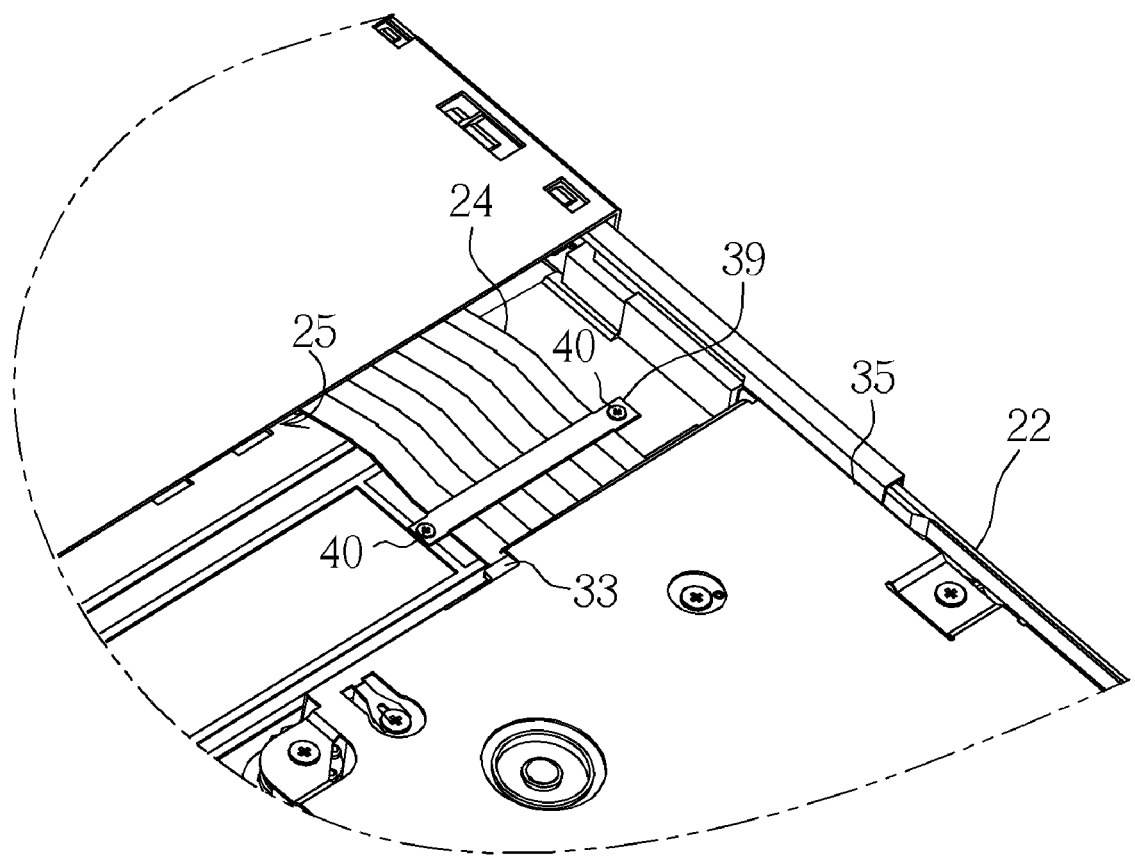
FIG. 7 is a partial back view diagram of a protection device for protecting the flat cable in the optical disk drive according to a fourth embodiment of the present invention.

As shown in FIG. 7, FIG. 7 is a partial back view diagram of a protection device for protecting the flat cable 24 in the optical disk drive 20 according to a fourth embodiment of the present invention. A basic structure of this embodiment is the same as the structure of the first embodiment. Difference between the fourth embodiment and the first embodiment is structure of a support frame 39. The support frame 39 is not extended from the cover 35 but further separately disposed on the tray 22 for holding the flat cable 24. The support frame 39 can be a long slice. The support frame 39 is disposed on the bottom of the tray 22 directly, which is adjacent to the position where the circuit board is connected to the flat cable 24 and is between the opening 25 and the end of the circuit board 33 when the tray 22 is drawn out of the casing 21. The support frame 39 crosses over and holds the flat cable 24 for preventing the flat cable 24 from dropping. The support frame 39 can be fixed on the bottom of the tray 22 by a fixing component 40, such as a screw or a rivet. The supporting frame 39 also can be integrated with the tray 22 monolithically for simplicity. Because the support frame 39 holds the flat cable 24, which is connected to the circuit board 33, on the bottom of the tray 22 tightly, the support frame 39 can be disposed on a more rear position in the tray 22 for preventing the support frame 39 from hitting the main board 23 and for holding more part of the flat cable 24 from being broken.

Those skilled in the art will readily observe that numerous modifications and alterations of the device and method may be made while retaining the teachings of the invention.

What is claimed is:

1. A protection device for protecting a flat cable in an optical disk drive comprising:
 a casing, whereon an opening is formed at a front edge of the casing, and a main board is fixed inside the casing;
 a tray disposed inside the casing in a slidable manner through the opening, a circuit board being disposed on a bottom of the tray;
 a flat cable connected to the main board and the circuit board;
 a cover disposed on the bottom of the tray; and
 a support frame disposed on the bottom of the tray and adjacent to a position, where the flat cable is connected to the circuit board, for holding the flat cable, the support frame being extended parallel to the bottom of the tray after the support frame is bent towards the tray for holding the flat cable on the bottom of the tray as a stair structure.

2. The protection device of claim 1, wherein the support frame is connected to the cover and extended towards a rear of the casing.

3. The protection device of claim 2, wherein the support frame is integrated with the cover monolithically.

4. The protection device of claim 1, wherein the support frame is bent towards the tray after extending a predetermined distance away from the circuit board, and the predetermined distance is substantially within one-fourths and three-fourths of a distance between the opening and an end of the circuit board when the tray is drawn out of the casing.

5. The protection device of claim 1, wherein a rear of the support frame extended from the cover and adjacent to the circuit board is bent towards the tray.

* * * * *